Patented Dec. 25, 1951

2,580,195

UNITED STATES PATENT OFFICE 2,580,195

METHOD OF PURIFYING 4-AMINO-SALICYLIC ACID

Karl Gustaf Rosdahl, Malmo, Sweden, assignor to Aktiebolaget Ferrosan, Malmo, Sweden, a corporation of Sweden No Drawing. Application December 13, 1948, Serial No. 65,074. In Sweden January 31, 1948

3 Claims. (Cl. 260—525)

The present invention refers to a method of purifying 4-aminosalicyclic acid and derivatives thereof having substituents bonded to the nucleus or amino group.

In the production of 4-aminosalicyclic acid and derivatives thereof having substituents bonded to the nucleus or amino group (halogen, alkyl, hydroxy, amino and N-4-aminoalkyl derivatives), prepared by the carbonation of amino phenols and as shown in the U. S. Patent 427,564 and the British Patent 12,191 of 1899, impurities arise which are difficult to separate without major losses or without using expensive solvents. It is very important that impurities are removed as completely as possible on account of the fact that the drug is used for long periods and in large doses. On account of the slight solubility of the 4-aminosalicyclic acid compounds in water and the sensitivity thereof to heat recrystallization from water is difficult to perform. Mixtures of water and organic solvents or organic solvents alone may be used for the purifying processes but are generally not sufficient for achieving the highest degree of purity. Nor do the aqueous solutions of the salts of potassium or sodium lend themselves thereto, as the corresponding salts of the impurities have very similar properties and therefore cannot be separated to any substantial extent by carbon treatment or similar generally accepted methods.

An object of the present invention is to provide a method of purifying the said class of compounds while avoiding the complication due to the poor solubility of said compounds in water and the sensitivity thereof to heat.

Another object of the invention is to provide a method of removing impurities from the said class of compounds and simultaneously obtaining the compounds in the form of preparations ready for use.

According to the invention, the 4-aminosalicylic acid or a derivative thereof having substituents bonded to the nucleus or amino group is converted into its carboxylic calcium or strontium salt which is readily soluble in water, and the salt solution is treated with active adsorption agents, whereupon the salt may or may not be reconverted into the initial 4-aminosalicylic acid or derivative thereof, respectively.

By the conversion of the 4-aminosalicylic acid compound into the form of a carboxylic salt of one of the earth alkali metals, as above indicated, a substantial purification is already achieved, inasmuch as several of the corresponding salts of the impurities are difficultly soluble in water, while such impurities otherwise are very similar to 4-aminosalicylic acid itself in respect of solubility. Such an aqueous solution is besides capable of being purified surprisingly readily by active adsorption agents, such as carbon and others, as distinct from the alkali salt solutions, especially when the solution is saturated with carbon dioxide to about pH 6.

In some cases the calcium salt solution may be directly used for clinical purposes after purification, because it has been found to have some advantages compared with e. g. the sodium salt, but otherwise it is converted either by precipitation with an acid into the amino acid or by double conversion with e. g. sodium phosphate into the sodium salt.

*Example.*—100 kgs. of 4-aminosalicylic acid are suspended in 1000 liters of water. To this is added, during agitation, so much calcium hydroxide that the reaction mixture will be slightly alkaline when a balance has been reached. The solution is filtered. The filtrate is treated with 5 kgs. of active carbon and filtered.

The solution may thereupon be used as it is, precipitated with hydrochloric acid or sulfuric acid or converted by means of a calculated quantity of sodium phosphate to obtain the sodium salt.

What I claim and desire to secure by Letters Patent is:

1. A method of purifying 4-aminosalicylic acid prepared by the carbonation of amino phenols, comprising converting such 4-aminosalicylic acid into a calcium carboxylate salt, and treating a solution of the salt with an active adsorption agent.

2. A method of purifying 4-aminosalicylic acid prepared by the carbonation of amino phenols, comprising converting such 4-aminosalicylic acid into a calcium carboxylic salt, treating a solution of the salt with an adsorption agent, and re-converting the salt into the initial 4-aminosalicylic acid.

3. A method of purifying 4-aminosalicylic acid prepared by the carbonation of amino phenols, comprising converting such 4-aminosalicylic acid into a calcium carboxylate salt, treating a solution of the salt with an active adsorption agent, and converting said salt into the sodium salt of 4-aminosalicylic acid.

KARL GUSTAF ROSDAHL.

REFERENCES CITED

The following references are of record in the file of this patent:

UNITED STATES PATENTS

| Number | Name | Date |
|---|---|---|
| 427,564 | Guehm | May 13, 1890 |
| 563,993 | Walter | July 14, 1896 |
| 1,847,518 | Laska et al. | Mar. 1, 1932 |

FOREIGN PATENTS

| Number | Country | Date |
|---|---|---|
| 12,191 of 1889 | Great Britain | May 31, 1890 |
| 279,865 | Germany | Jan. 29, 1914 |

OTHER REFERENCES

Sabalitschka, Archiv. der Pharm und Ber der Deutschen Pharmaz. Ges., vol. 272, p. 387 (1934).

Abraham et al., Brit. Journal of Exptal. Pathology, vol. 23, June 1942, p. 105.

Lehmann, Chem. Abs., vol. 40, p. 7300.